United States Patent [19]

Frank

[11] 4,190,744
[45] Feb. 26, 1980

[54] CIRCUIT ARRANGEMENT AND PROCESS FOR PRODUCING CONFERENCE CONNECTIONS BETWEEN THREE CONFERENCE PARTIES IN A PCM TIME MULTIPLEX SWITCHING SYSTEM

[75] Inventor: Richard J. Frank, Marlton, N.J.

[73] Assignee: Siemens Aktiengesellschaft, Berlin & Munich, Fed. Rep. of Germany

[21] Appl. No.: 912,399

[22] Filed: Jun. 5, 1978

[51] Int. Cl.² .............................................. H04M 3/56
[52] U.S. Cl. ........................... 179/18 BC; 179/15 AT
[58] Field of Search ........... 179/1 CN, 15 AT, 18 BC

[56] References Cited

U.S. PATENT DOCUMENTS

| | | | |
|---|---|---|---|
| 3,551,600 | 12/1970 | Berch | 179/18 BC |
| 3,984,643 | 10/1976 | Inrig et al. | 179/18 BC |

*Primary Examiner*—Robert S. Tupper
*Assistant Examiner*—Joseph A. Popek
*Attorney, Agent, or Firm*—Hill, Van Santen, Steadman, Chiara & Simpson

[57] ABSTRACT

In producing conference connections between, in each case, three conference parties in a PCM time multiplex switching system, sum code words formed of PCM words supplied by the respective remaining conference parties, possibly after conversion thereof into linear code representations and reconversion into non-linear code representations subsequent to summation, are fed to the conference parties. For each conference party a coordinated memory cell, which is selectively triggered not only during writing but also during reading is engaged in two equal-sized halves of an information memory. The PCM words delivered by the conference parties are written into the engaged memory cell of the first half of the information memory during the time position in which they occur and the PCM word located in the cell is, in the process, not only fed to an adder as a first input magnitude, but also read into the relevant engaged memory cell of the second half of the information memory. The PCM word located in the second half of the memory is, in the process, read and fed to the adder as a second input magnitude and the sum code word (A+B, B+C, A+C) supplied by the adder is fed to that conference party whose PCM word has been entered into the engaged memory cell of the first half of the information memory.

9 Claims, 1 Drawing Figure

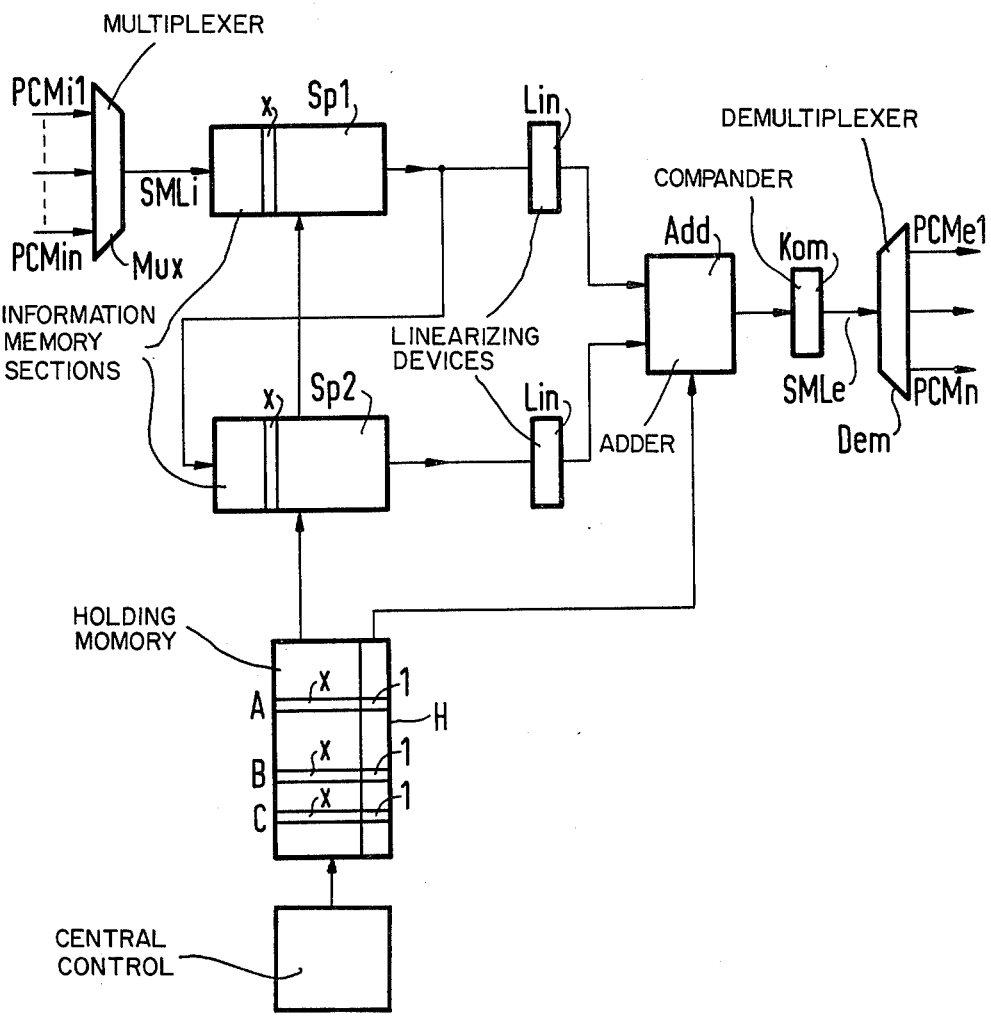

CIRCUIT ARRANGEMENT AND PROCESS FOR PRODUCING CONFERENCE CONNECTIONS BETWEEN THREE CONFERENCE PARTIES IN A PCM TIME MULTIPLEX SWITCHING SYSTEM

BACKGROUND OF THE INVENTION

1. Field of the Invention

The present invention relates to a process and to a circuit arrangement for producing conference connections between, respectively, three conference parties in a PCM time multiplex switching system, in which sum code words are fed to the conference parties, respectively, which sum words are formed from PCM words supplied by the respective other conference parties, possibly after conversion of the PCM words into linear code representations and reconversion into non-linear code representations subsequent to the summation.

2. Description of the Prior Art

The formation of sum code words in which, respectively, the specific portion of the conference party to whom the sum code word is fed is lacking, is particularly necessary in those cases in which loud room noises occur at the individual parties, which noises make themselves noticeable as intereference beyond the side-tone level which is desirable per se.

In a known process of this type, as disclosed in U.S. Pat. No. 3,984,643, sum code words are first formed which contain the sum portions of all conference parties. Subsequently, in the respectively same pulse frame of the time multiplex operation, several remainder sums are formed by subtraction of individual conference parties' respective portions, which sums are sent to, respectively, that conference party whose own portion is not contained in this remainder sum. The subtraction of the respective portions is accomplished with the aid of the same device with which the addition was carried out, for which purpose the operational assigned bit of the respective PCM word representing the portion of that party is converted and then an addition of the formed PCM word is undertaken.

In contrast to the double use of an arithmetic unit for addition and subtraction, which is possible with this process, is a relatively large time expenditure, with the consequence that the adder must be able to operate very rapidly so that the operations described can be performed within a pulse frame, which, in turn leads to a relatively high price for such devices.

In smaller auxiliary exchanges it is frequently sufficient if the possibility of being able to carry on conference discussions is limited to three conference parties.

SUMMARY OF THE INVENTION

It is therefore the object of the present invention to provide a process for producing conference connections between respectively three conference parties, which process is particularly favorable not only as far as the apparatus expense is concerned, but also with respect to the amount of time required, and to providing apparatus for carrying out this process.

The above object is achieved in that, for each conference connection, a coordinating memory cell, which is selectively triggered not only during writing but also during reading, is engaged, in each case, in two equal-sized halves of an information memory, and that the PCM words supplied by the conference parties are written into the engaged memory cell of the first half of the information memory during the time position in which they occur. The PCM word located in the memory cell is, in the process, not only fed to an adder as a first input magnitude, but is also written into the pertinent engaged memory cell of the second half of the information memory. The PCM word located in this latter memory cell is, in the process, read and fed to the adder as a second input magnitude. Responsive to these magnitudes, a sum code word is provided by the adder and fed to that conference party whose PCM word was entered into the engaged memory cell of the first half of the information memory.

In carrying out the process there is, in connection with the formation of sum code words, only one kind of arithmetic operation to be carried out, namely an addition, which makes itself noticeable not only in the lesser expensive arrangement, but also in short processing times. Additionally, the control expense in connection with the sum formation is very small.

According to a particular feature of the invention, circuits of a switching station which serve primarily for the switching of dual connections are commonly used in the sum word formation in connection with conference connections.

According to another feature of the invention, a circuit arrangement is provided which, in an advantageous manner, serves for carrying out the process, where, in a special variation of the circuit arrangement, consideration is given to the above-mentioned double use of circuits of a switching station for conference connections, on the one hand, and for normal dual connections, on the other hand.

BRIEF DESCRIPTION OF THE DRAWING

Other objects, features and advantages of the invention, its organization, construction and mode of operation will be best understood from the following detailed description, taken in conjunction with the accompanying drawing on which there is a single FIGURE which is a schematic representation of a circuit arrangement constructed in accordance with and for carrying out the process of the present invention.

DESCRIPTION OF THE PREFERRED EMBODIMENT

Referring to the drawing, the arrangement represented is a component of a PCM time multiplex switching system and serves not only for producing conference connections, but also for producing connections between only two parties.

An essential component of this arrangement is an information memory which comprises two equal-sized halves Sp1 and Sp2, of which, as will be explained in the discussion below, the half Sp1 is utilized alone when dual connections are involved.

A super multiplex line SMLi for the incoming communication direction is connected to the first information memory half Sp1. The information flow from n PCM time multiplex lines PCMil–PCMin for incoming communications are combined on the super multiplex line and are connected to the super multiplex line by way of a multiplexer Mux. Correspondingly, n·32, and preferably 16·32, time positions are formed on the super multiplex line.

The transmission of the super multiplex line SMLi occurs in bit-parallel fashion; the transmission of a PCM word thus requires only a one-bit time span.

In each case, the two information memory halves Sp1 and Sp2 have, for each PCM word, a number of memory cells corresponding to the number of dual connections to be anticipated. As a rule, this number is greater than the number of the conference connections to be anticipated. If the described arrangement only has to serve for producing conference connections, the number of memory cells of the information memory sections is tailored thereto, of course.

The outputs of the memory cells of the memory half Sp1 are connectable, on the one hand, to the inputs of the second memory half Sp2, and, on the other hand, with the first input of an adder Add. The outputs of the second memory half Sp2 are connectable to the second input of the adder Add.

On the assumption that the PCM words are coded non-linearly the inputs of the adder Add must have devices Lin connected ahead to convert the non-linearly coded PCM words into linearly coded PCM words which have, for example, 14 bits. Correspondingly, there is connected to the output of the adder Add a device Kom, which performs a reconversion of the sum word emitted by the adder from the linear code representation into a companded non-linear code representation.

Connected to the device Kom is a super multiplex line SMLe for the outgoing communication direction, which leads to a demultiplexer Dem which distributes the information flow on the outgoing super multiplex line onto the PCM time multiplex lines for outgoing communication direction, namely the lines PCMe-1–PCMn which are connected to the output of the demultiplexer.

A retention memory H serves for triggering the aforementioned memory halves Sp1 and Sp2. The retention memory has as many memory cells for triggering addresses of the information memories Sp1 and Sp2 as there are time positions formed on the super multiplex line SMLi or, respectively, SMLe, thus, 512 memory cells in the above-mentioned connection of 16 PCM time multiplex lines. Each of the memory cells is expanded by at least one memory location in which information is stored concerning whether the triggering address in the associated memory cell involves a triggering address in connection with a conference connection or with a dual connection. The information read from these additional storage locations influence the effectiveness of the adder Add, as will be explained below.

The mode of operation of the arrangement represented on the drawing is explained in greater detail below in connection with a conference connection.

For this purpose, it is assumed that the conference connection is to exist between three conference parties, to whom the time channels A, B and C are assigned. In the retention memory H, the respective addresses x of an optional pair of free memory cells in the information memory sections Sp1 and Sp2 are entered in the retention memory cells which have been assigned to these three time positions. At the additional storage locations of these memory cells, there is, above and beyond that, additional information entered, which, when read, activates the adder Add.

Now, when the information of conference party A arrives in the corresponding time position on the super multiplex line SMLi, the memory cell of the retention memory H assigned to this time position is simultaneously activated in the course of the cyclical operation of the retention memory, as a result of which the triggering addresses of the memory cells x is supplied to the information memories Sp1 and Sp2, so that the mentioned information of the conference party A can pass into the memory cell x of the first part Sp1 of the information memory. During the subsequent time position assigned to the conference party B, the information supplied by that party passes in a corresponding manner into the memory cell x of the information memory half Sp1; simultaneously, the information located in that memory cell, which stems from the party A, is written into the memory x of the second information memory Sp2.

During the time position of the third conference party C, the PCM word supplied by that party passed into the memory cell x of the information memory half Sp1; the information located in that memory cell, which stems from the party B, is read and written into the memory cell x of the second information memory half Sp2, and is simultaneously supplied, by way of the arrangement Lin, to the first input of the adder Add, for code conversion. With the entry of the PCM word in the memory cell x of the second information memory half Sp2 which stems from the conference party B, the PCM word located in that memory cell which stems from the conference party A, is also passed, for code conversion, to the second input of the adder Add via the device Lin. The adder Add carries out an addition of the PCM words stemming from the conference parties A and B and passes along a corresponding sum code word via the device Kom to the super multiplex line SMLe for the outgoing transmission direction, for code conversion from linear code representation into non-linear code representation, during the time position assigned to the conference party C.

During the subsequent time positions, corresponding operations are repeated, i.e., during the following time position of the conference party A, a sum code word supplied in common by conference parties B and C is emitted to the super multiplex line SMLe for the outgoing transmission direction, and during the time position assigned to the conference party B, a sum code word supplied in common by the conference parties A and C is emitted to the super multiplex line SMLe for the outgoing transmission direction.

If a normal dual connection is to exist, then the information situated in the additional locations of the memory cells of the retention memory H causes the adder Add not to act as an adder, but rather simply to pass along to the super multiplex line SMLe the PCM word supplied by the first information memory half Sp1. The operations proceeding in this case in the information memory half Sp2 then remain without effect.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A process for establishing conference connections between first, second and third parties (A,B,C) in a pulse code modulation time multiplex switching system in which each of the parties (A,B,C) supplies a pulse code modulated code word, and in which in each case, sum code words (A+B, B+C, A+C) which are formed of pulse code modulated code words supplied by two of the parties are transmitted to the remaining party of the conference, comprising the steps of:

receiving the pulse code modulated words supplied by the conference parties (A,B,C);

writing the received pulse code modulated words into a memory cell of a first memory section during the respective time slots of the parties (A,B,C) in which such words occur;

during the writing into the first memory section, reading the pulse code modulated word already stored at that location to an adder as a first magnitude and writing the read pulse code modulated into a memory cell of a second memory section;

during writing into the second memory section, reading the pulse code modulated word already stored at that location to the adder as a second magnitude;

adding the first and second magnitudes to obtain the sum code words (A+B, B+C, A+C); and feeding the sum code words (A+B), (B+C), (A+C) to the respective conference parties (C),(A),(B) whose pulse code modulated word does not appear in the respective sum code words.

2. The process of claim 1, further defined by the step of:

selectively triggering the memory cells during writing and reading in the two memory sections.

3. The process of claim 1, wherein the steps of:

receiving pulse code modulated code words is further defined as including the steps of:

receiving non-linear code representations; and converting the non-linear code representations to linear code representations.

4. The process of claim 3, wherein the step of feeding the sum code words to the conference parties is further defined as including the step of:

converting the sum code words into non-linear code representations; and feeding the non-linear code representations to the conference parties.

5. A circuit arrangement for establishing conference connections between three conference parties (A,B,C) in a pulse code modulation time multiplex switching system in which each of the parties supplies pulse code modulated code words to the switching system, and in which the switching system supplies sum code words (A+B, B+C, A+C) to the respective party (C),(A), (B) whose code word does not appear in a sum code word, comprising:

a plurality of incoming pulse code modulation subscriber lines and a plurality of outgoing pulse code modulation subscriber lines;

an incoming supermultiplex line and an outgoing supermultiplex line;

a multiplexer connecting said incoming pulse code modulation subscriber lines to said incoming supermultiplex line;

a demultiplexer connecting said outgoing supermultiplex line to said outgoing pulse code modulation subscriber lines;

an information memory including a triggering input and first and second memory sections each comprising a number of memory cells corresponding to, at most, the number of simultaneous conference connections anticipated, said memory cells of said first memory section including inputs connected to said incoming supermultiplex line, and including outputs, and said memory cells of said second memory section including inputs connected to said outputs of said memory cells of said first memory section, and including outputs;

an adder including a plurality of inputs and an output;

first and second connection means connecting said outputs of said memory cells of said first and second memory sections to first and second ones of said inputs of said adder;

third connection means connecting said output of said adder to said outgoing supermultiplex line; and a retention memory connected to said triggering input of said information memory, said retention memory including a plurality of cyclically operated memory cells, equal in number to the number of time slots on the super-multiplex lines, storing the memory addresses of said memory cells of said information memory and operated to trigger co-ordinated memory cells in both memory sections to simultaneously write code words into said memory cells and read stored code words to said adder.

6. The circuit arrangement of claim 5, also for two-party connections, wherein:

each of said memory sections has a number of memory cells equal to the number of anticipated two-party connections;

said retention memory also comprises, for each memory cell thereof, an additional storage location connected to another input of said adder and storing information which causes said adder to add for conference calls and to pass through information received from the first memory section in the case of two-party calls.

7. The circuit arrangement of claim 5, wherein said first and second connection means each comprise non-linear to linear conversion means.

8. The circuit arrangement of claim 7, wherein said third connection means comprises a compander.

9. A circuit arrangement for establishing conference connections between three conference parties (A,B,C) in a pulse code modulation time multiplex switching system in which each of the parties supplies pulse code modulated code words to the switching system, and in which the switching system supplies sum code words (A+B, B+C, A+C) to the respective parties (C), (A), (B) whose code word does not appear in a sum code word, comprising:

an incoming multiplex line and an outgoing multiplex line;

an information memory including a triggering input and first and second memory sections each comprising a number of memory cells corresponding to, at most, the number of simultaneous conference connections anticipated, said memory cells of said first memory section including inputs connected to said incoming supermultiplex line, and including outputs, and said memory cells of said second memory section including inputs connected to said outputs of said memory cells of said first memory section, and including outputs;

an adder including a plurality of inputs and an output;

first and second connection means connecting said outputs of said memory cells of said first and second memory sections to first and second ones of said inputs of said adder; and a retention memory connected to said triggering input of said information memory, said retention memory including a plurality of cyclically operated memory cells, equal in number to the number of time slots on the supermultiplex lines, storing the memory addresses of said memory cells of said information memory and operated to trigger corresponding memory cells in both memory sections to simultaneously write code words into said memory cells and read stored code words to said adder.

* * * * *